3,145,212
BENZOPHENONE-2-CARBOXYLIC ACID ADDI-
TION SALTS OF 1-METHYL-3-(DI-2-THIEN-
YLMETHYLENE) PIPERIDINE
Makoto Yamamoto, Yao, and Hiroshi Yoshikawa, Toyo-
naka, Japan, assignors to Tanabe Seiyaku Co., Ltd.,
Higashi-ku, Osaka, Japan
No Drawing. Filed Dec. 4, 1961, Ser. No. 156,940
Claims priority, application Japan Dec. 19, 1960
2 Claims. (Cl. 260—293.4)

This invention relates to benzophenone-2-carboxylic acid addition salts of 1-methyl-3-(di-2-thienylmethylene) piperidine and to processes for preparing the same.

It has been known that the acid addition salts of 1-methyl-3-(di-2-thienylmethylene)piperidine are effective with human beings as an antitussive and an expectorant composition (Kase et al., Chemical and Pharmaceutical Bulletin, Vol. 7, page 372, 1959; Sugimoto et al., ibid., Vol. 8, page 745, 1960). However, the water-soluble acid addition salts of the above compound, such as the hydrochloride and the citrate, are inconvenient for oral administration due to their bitter taste.

According to this invention we have now found that certain benzophenone-2-carboxylic acid addition salts of 1-methyl-3-(di-2-thienylmethylene)piperidine are palatable and are useful in therapeutics especially for oral administration.

The new compounds of this invention are represented by the following formula:

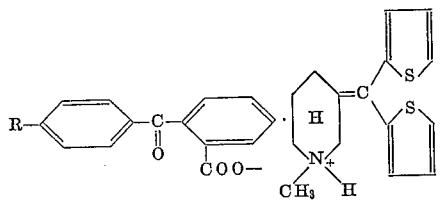

wherein R stands for H atom or —OH radical.

The new compounds are advantageously prepared by metathetically reacting, for instance, an alkali metal salt of benzophenone-2-carboxylic acid or its 4'-hydroxy derivative with a water-soluble acid addition salt of the base, such as the hydrochloride and the citrate, in an aqueous solution. After standing for a time, the sparingly soluble addition salts crystallize out. However, it is also possible to react the free base directly with the carboxylic acid. In this case, the reaction is advantageously carried out in an organic solvent, such as ether or acetone, from which the desired salts are obtained by conventional means.

The following examples illustrate the invention.

Example 1

16.5 g. of 1-methyl-3-(di-2-thienylmethylene)piperidine base in 40 ml. of acetone was added to a solution of 14.5 g. of 4'-hydroxybenzophenone-2-carboxylic acid in 70 ml. of acetone with stirring.

Crystallization began immediately. The crystals were recovered by filtration, washed with a small amount of acetone and dried. 30 g. of 4'-hydroxybenzophenone-2-carboxylic acid addition salt of 1-methyl-3-(di-2-thienylmethylene)piperidine melting at 187°–190° C. was obtained.

Yield: 96.7% of theory.

The base content.—Calculated, 53.2%. Found, 51.8%.

Example 2

14.5 g. of 4'-hydroxybenzophenone-2-carboxylic acid was dissolved in 120 ml. of 3% aqueous solution of sodium hydroxide. To this solution, was added 28.1 g. of 1-methyl-3-(di-2-thienylmethylene)piperidine citrate in 180 ml. of water with stirring. Crystallization began immediately. The crystals were recovered by filtration, washed with water and recrystallized from ethanol. 26.4 g. of 4'-hydroxybenzophenone-2-carboxylic acid melting at 189°–190° C. was obtained.

Yield: 85% of theory.

Example 3

2.7 g. of 1-methyl-3-(di-2-thienylmethylene)piperidine in 40 ml. of acetone was added to a solution of 2.4 g. of benzophenone-2-carboxylic acid hydrate in 5 ml. of acetone. The mixture was allowed to stand for a time at room temperature thereby the addition salt crystallized out. The crystals were recovered by filtration, washed with acetone and dried. 4.3 g. of benzophenone-2-carboxylic acid addition salt of 1-methyl-3-(di-2-thienylmethylene)piperidine melting at 132° C. was obtained.

Yield: 87.4% of theory.

The base content.—Calculated, 54.9%. Found, 54.4%.

Example 4

2.5 g. of benzophenone-2-carboxylic acid hydrate was dissolved in 20 ml. of 3% aqueous solution of sodium hydroxide. To the solution, was added 4.8 g. of 1-methyl-3-(di-2-thienylmethylene)piperidine citrate in 30 ml. of water. The mixture was allowed to stand for a time at room temperature thereby the addition salt crystallized out. The crystals were collected by filtration and recrystallized from methanol. 4.4 g. of benzophenone-2-carboxylic acid addition salt of 1-methyl-3-(di-2-thienylmethylene)piperidine melting at 132°–133° C. was obtained.

Yield: 85.5% of theory.

What we claim is:
1. The benzophenone-2-carboxylic acid addition salt of 1-methyl-3-(di-2-thienylmethylene)piperidine.
2. The 4'-hydroxybenzophenone-2-carboxylic acid addition salt of 1-methyl-3-(di-2-thienylmethylene)piperidine.

References Cited in the file of this patent
UNITED STATES PATENTS
2,829,160    Stehman et al. _____ Apr. 1, 1958
3,043,844    Elpern _____ July 10, 1962

OTHER REFERENCES
Prigot et al.: Journal of the American Chemical Society, Volume 70, pages 2758–2759 (1948).
Higaki et al.: Yakugaku Kenkyu, Volume 21, page 7 (1959), 260–293–4.
Sugimoto et al.: Chemical and Pharmaceutical Bulletin, Volume 8, pages 745–748 (1960).